No. 875,240. PATENTED DEC. 31, 1907.
F. C. BROWN.
LAWN SHEARS.
APPLICATION FILED AUG. 3, 1907.
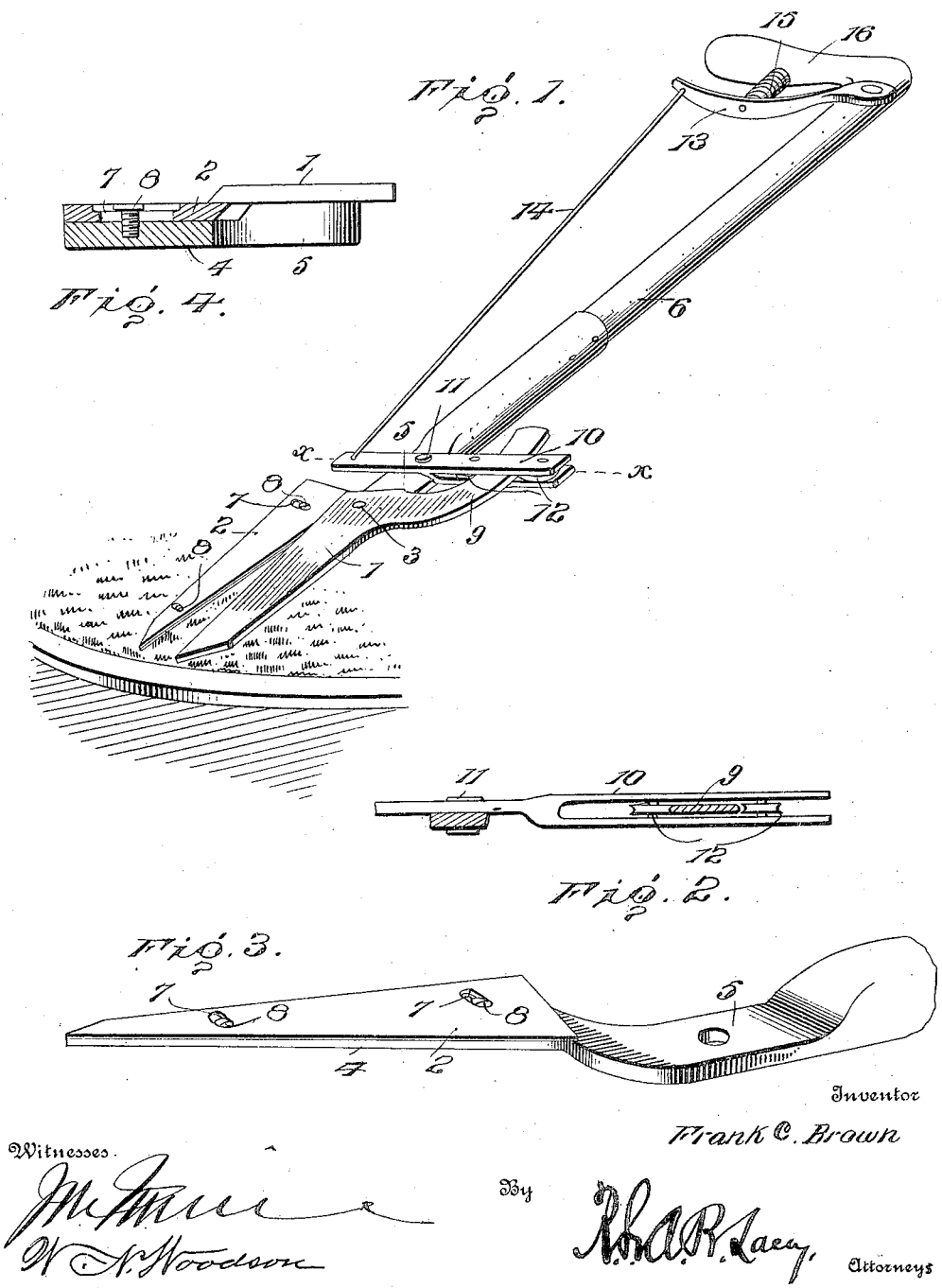
Inventor
Frank C. Brown
Witnesses
By
Attorneys
THE NORRIS PETERS CO., WASHINGTON, D. C.

UNITED STATES PATENT OFFICE.

FRANK C. BROWN, OF ASHERVILLE, KANSAS.

LAWN-SHEARS.

No. 875,240.      Specification of Letters Patent.      Patented Dec. 31, 1907.

Application filed August 3, 1907. Serial No. 386,971.

*To all whom it may concern:*

Be it known that I, FRANK C. BROWN, a citizen of the United States, residing at Asherville, in the county of Mitchell and State of Kansas, have invented certain new and useful Improvements in Lawn-Shears, of which the following is a specification.

This invention provides an implement of novel form to admit of trimming the grass on lawns close to fences, sidewalks, trees, plants and shubbery.

In its construction, the implement resembles a pair of shears having a handle, a pair of blades and operating means, the latter being of such formation as to enable the implement to be manipulated and worked by one hand.

For a full understanding of the invention and the merits thereof and also to acquire a knowledge of the details of construction and the means for effecting the result, reference is to be had to the following description and accompanying drawings.

While the invention may be adapted to different forms and conditions by changes in the structure and minor details without departing from the spirit or essential features thereof, still the preferred embodiment is shown in the accompanying drawings, in which:

Figure 1 is a perspective view of lawn shears embodying the invention. Fig. 2 is a sectional view on the line *x—x* of Fig. 1. Fig. 3 is a detail view of the base receiving the stationary shear blade, but each blade is relatively adjustable to compensate for wear.

Corresponding and like parts are referred to in the following description and indicated in all the views of the drawings by the same reference characters.

The shears comprise a movable blade 1 and a fixed blade 2, the two blades being pivoted at 3 by means of a suitable fastening. The fixed blade 2 is provided with a handle which by preference is of sectional formation. A base plate 4 forms a support for the fixed blade 2 and the lower portion 5 of the handle projects therefrom and terminates at its upper or outer end in a socket in which is secured the upper portion 6 of the handle. The fixed blade 2 is formed near opposite ends with transverse slots 7 through which fastenings 8 pass and serve to secure the blade 2 to the base or support 4 in the adjusted position. While the blade 2 is adapted to be secured to the base or support 4 in an adjusted position, it, nevertheless, remains fixed when in operation and is adjusted to compensate for wear only.

The movable blade 1 overlaps the fixed blade 2 and is provided with a curved arm 9 which serves to impart an oscillatory or pivotal movement to the blade 1. The arm 9 is flat and has sliding or running connection with one arm of a lever 10 pivoted at 11 to the handle. The lever 10 crosses the handle and projects from opposite sides thereof. The end of the lever 10 coöperating with the curved arm 9 is slotted to receive said arm and is provided with pulleys 12 between which the curved arm 9 is arranged, said pulleys being grooved in their edges to receive opposite edge portions of the curved arm and prevent frictional contact of said arm with the sides of the lever bordering upon the slot through which the curved arm 9 passes. As the lever 10 is oscillated, it coöperates with the curved arm 9 and imparts a corresponding movement to the blade 1, whereby the shears are opened and closed in the well known manner. A handle lever 13 pivoted at one end to the handle of the implement, is connected by means of a rod 14 with the end of the lever 10 opposite to that coöperating with the curved arm 9 and is spring actuated to normally hold the shear blades open. The spring 15 exerting a pressure upon the handle lever 13 is interposed between said lever and the grip 16 at the upper or outer end of the handle.

The shear blades may be of any length and the handle extended therefrom may be straight or of any form best adapted to the convenience of the operator, so as to obviate bending or stooping when using the implement for trimming the lawn. The grip 16 and the hand lever 13 are of such construction and relation as to admit of both being conveniently gripped by the hand so that upon tightening the grip, the lever 13 may be moved towards the grip 16 and thereby operate the lever 10 to effect closing of the shears. Upon relaxing the grip, the lever 13 moves away from the grip 16 by the action of the spring 17, thereby automatically opening the shears. It will thus be understood that the shears are operated by alternately tightening and relaxing the grip upon the parts 13 and 16. As will be obvious, the construction of the implement is such as to admit of its convenient use close to fences, sidewalks, plants and shrubbery, where the ordinary lawn mower cannot be advantageously used.

Having thus described the invention, what is claimed as new is:

1. In an implement of the character set forth, the combination of a shear blade, a second shear blade having pivotal connection with the first mentioned shear blade and provided with a curved arm, an operating lever having a slot to receive the curved arm of the pivoted shear blade, spaced pulleys mounted upon the operating lever and receiving the said curved arm between them, and means for imparting oscillatory movement to the operating lever to effect opening and closing of the shear blade.

2. In combination, a shear blade, a second shear blade having pivotal connection with the first mentioned shear blade and provided with a curved arm, an operating lever, spaced pulleys mounted upon the operating lever and receiving the said curved arm between them, and means for imparting oscillatory movement to said operating lever.

3. In combination, a relatively fixed shear blade, a handle extended therefrom, a pivoted shear blade coöperating with the fixed shear blade and having a curved arm, an operating lever pivoted between its ends to the said handle and having an end portion coöperating with the said curved arm to impart an oscillatory movement to the pivoted shear blade, a lever pivoted to said handle, and connecting means between the said lever and the operating lever.

In testimony whereof I affix my signature in presence of two witnesses.

FRANK C. BROWN. [L. S.]

Witnesses:
 JAY M. DARROW,
 C. G. COSSAINT.